United States Patent [19]

Hendrickson

[11] Patent Number: 5,551,651
[45] Date of Patent: Sep. 3, 1996

[54] HIGH LIFT OUT-OF-CONTOUR FLAP FOR AIRCRAFT WING

[75] Inventor: Ronald H. Hendrickson, Smithtown, N.Y.

[73] Assignee: Grumman Aerospace Corporation, Los Angeles, Calif.

[21] Appl. No.: 288,996

[22] Filed: Aug. 11, 1994

[51] Int. Cl.$^6$ ................................................ B64C 9/16
[52] U.S. Cl. .................................... 244/215; 244/216
[58] Field of Search ............................. 244/213, 215, 244/216, 35 R

[56] References Cited

U.S. PATENT DOCUMENTS

| | | | |
|---|---|---|---|
| 2,030,631 | 2/1936 | Gwinn, Jr. | 244/215 |
| 2,191,839 | 2/1940 | Zap | 244/215 |
| 2,276,522 | 3/1942 | Staufer | 244/216 |
| 3,129,907 | 4/1964 | Dornia et al. | 244/216 |
| 3,203,647 | 8/1965 | Alvarez-Calderon | 244/216 |
| 3,208,693 | 9/1965 | Riedler et al. | 244/42 |
| 3,743,219 | 7/1973 | Gorges | 244/42 CA |
| 3,770,227 | 11/1973 | Von Ohain et al. | 244/42 CA |
| 3,778,009 | 12/1973 | Jones | 244/216 |
| 3,831,886 | 8/1974 | Burdges et al. | 244/42 CC |
| 3,897,029 | 7/1975 | Calderon | 244/42 CA |
| 4,498,646 | 2/1985 | Proksch et al. | 244/216 |
| 4,856,735 | 8/1989 | Lotz | 244/35 R |
| 4,995,575 | 2/1991 | Stephenson | 244/216 |
| 5,178,348 | 1/1993 | Bliesner | 244/212 |

FOREIGN PATENT DOCUMENTS

| | | | |
|---|---|---|---|
| 469910 | 2/1992 | European Pat. Off. | 244/215 |
| 665964 | 10/1938 | Germany | 244/215 |

*Primary Examiner*—Galen L. Barefoot
*Attorney, Agent, or Firm*—Terry J. Anderson; Karl J. Hoch, Jr.

[57] ABSTRACT

A wing structure including an assembly which is basically constituted of a main airfoil and a lift augmenting device in the form of a flap articulated to the airfoil so as to facilitate a high degree of lift to be imparted to the wing responsive to deployment of the flap. More particularly, there is disclosed a novel configuration of a trailing edge flap for a wing structure, wherein the upper surface of the flap is imparted an out-of-contour or curvilinearly raised configuration during periods of being stowed in the main airfoil whereby upon deployment of the flap into its deflected operative position will enhance the ability of the flap to derive an improvement in lifting capability and efficiency in comparison with presently conventional high lift trailing edge flaps. Also disclosed is a method of augmenting the high lift capabilities of trailing edge flaps which are operatively articulated to the main airfoils of aircraft wings so as to provide for an improved overall lifting characteristic for the aircraft wing structure.

39 Claims, 8 Drawing Sheets

HIGH LIFT OUT-OF-CONTOUR FLAP FOR AIRCRAFT WING

BACKGROUND OF THE INVENTION

1. Field of the Invention

The present invention relates to a wing structure comprising an assembly which is basically constituted of a main airfoil and a lift augmenting device in the form of a flap articulated at the trailing edge of the airfoil so as to facilitate a high degree of lift to be imparted to the wing responsive to deployment of the flap. More particularly, the invention is directed to a novel configuration of a trailing edge flap for a wing structure, particularly an aircraft wing, wherein the upper surface of the flap is imparted an out-of-contour or curvilinearly raised configuration during periods of being stowed in the main airfoil whereby upon deployment of the flap into its deflected operative position will enhance the ability of the flap to derive an improvement in lifting capability and efficiency in comparison with presently conventional high lift trailing edge flaps. The invention is also directed to a method of augmenting the high lift capabilities of trailing edge flaps which are operatively articulated to the main airfoils of aircraft wings so as to provide for an improved overall lifting characteristic for the aircraft wing structure.

As is well known in the aircraft and aerospace technology in both military and commercial aircraft wing design applications, high lift, high performance aircraft wing structures include main airfoils which are in most instances equipped with high lift devices, such as trailing edge flaps operatively articulated to the main airfoil, and wherein the trailing edge flaps are ordinarily positioned in a stowed condition in the trailing end or cove portion of the main airfoil of the wing during cruise operation of the aircraft. During landing or take-off of the aircraft, the flaps are deployed into their high lift augmenting positions in that the flaps are articulated so as to be deflected downwardly relative to the main airfoil of the aircraft wing to which the trailing edge flaps are connected; for instance, such as by being movable on tracks and/or rotatable about hinges.

Ordinarily, the high lift devices, such as the trailing edge flaps of the wing structure, are each configured so as to have at least the upper surface thereof constitute a smooth continuation of the aerodynamic surface of the main airfoil when stowed therein during high speed cruise operating modes of the aircraft. Consequently, the trailing edge flap chord-wise cross-sectional geometry provides for relatively flat taperingly converging upper and lower flap surfaces, with a highly curved leading end joining the divergent front ends of the flat surfaces, and all of the flap surface curvature being normally concentrated within the forward 30–40% of the length of the trailing edge flap chord.

For instance, for slotted flaps, an opening is created between the trailing end of the main airfoil and the leading end or forward curvilinear surface of the trailing edge flap when the flap is deployed so as to be deflected downwardly relative to the main airfoil into its high lift mode, such as during aircraft landing or take-off, thereby causing a flow of air to be accelerated upwardly trough the slot and to stream over the surface of the flap, mixing with and energizing a flow of air streaming over the main airfoil. In this instance, the slot produces a high velocity airflow which must be directed so as to ideally closely follow the contour along the upper surface of the trailing edge flap. However, the high degree of curvature which is present at the leading end of the trailing edge flap is subject to a tendency to produce a pressure gradient along the upper surface of the flap which retards the airflow, thereby causing the boundary layer which is present on the surface of the flap to either thicken or even to separate from the flap. In connection with the foregoing, a thick or heavy boundary layer reduces the amount of turning which the airflow experiences, and the added lift imparted to the aircraft wing which is due to the flap deployment resultingly decreases. The reduction in the lift is evidenced as a decrease in the additional lift due to the flap as the angle of attack is increased; for instance, for constant flap deflection, or as a so-called "roll-off" in the flap lift increment with an increasing flap deflection, such as at a constant angle of attack. This, in essence, considerably reduces the effectiveness and degree of efficiency of the high lift which is desired as a result of the flap deployment; in essence, the downward deflection of the flap relative to the main airfoil from its stowed normal cruise condition in the latter.

2. Discussion of the Prior Art

Although various high lift devices for aircraft wing structures are known in this technology; for example, in the provision of trailing edge flaps or leading edge flaps which are articulated to a main high performance or high lift airfoil, these currently developed lifting augmenting devices or wing flaps generally do not exhibit the degree of efficiency desired in the deployment of the high lift devices, in essence, the aerodynamically optimized configured flap surface structures which are articulated to the main airfoil.

U.S. Pat. No. 3,831,886 to Burdges et al. discloses a leading edge high lift device in the shape of a foreflap articulated to a main airfoil of an aircraft wing, and which foreflap is adapted to be pivoted relative to the airfoil so as to enable high lift operation without adversely affecting the high speed cruise performance of the aircraft.

U.S. Pat. No. 3,208,693 to Riedler et al. discloses a lift augmenting device in the form of a leading edge flap slot configuration which will increase the lift of the airfoil upon being extended therefrom.

U.S. Pat. No. 3,897,029 to Calderon discloses an airfoil with a double-slotted leading end flap which is adapted to be employed in operative cooperation with a multi-slotted trailing edge slot structure in order to provide improved high lift coefficients during landing and take-off of an aircraft, and which discloses various basic shapes and proportions in conjunction with intended physical applications.

U.S. Pat. No. 4,995,575 to Stephenson discloses a wing trailing edge flap mechanism which is adapted to provide a double-slotted configuration during deployment of the trailing edge flap upon being extended from its stowed condition in the main aircraft wing airfoil during normal cruise configurations.

U.S. Pat. No. 3,743,219 to Gorges discloses a high lift leading edge device in the form of a leading edge wing flap which is adapted to be extended into its deployed condition so as to assume a desired non-uniform degree of curvature and to thereby enhance the lifting characteristics for the aircraft wing.

Finally, U.S. Pat. No. 5,178,348 to Bliesner discloses a contoured wing and trailing edge flap assembly in which the flap is adapted to be deflected into its deployed condition, and which the flap incorporates a contoured upper surface to counteract any adverse effects of wake-producing devices positioned upstream of a slot which is formed between the trailing end of the airfoil and the leading end of the deployed trailing edge flap so as to produce a desired pressure distribution and thin boundary layer over the upper surface of the trailing end flap.

Although all of the foregoing aircraft wing structures incorporating either leading edge flaps or trailing edge flaps which are articulated to the main airfoil portion of the wing and are deployable in order to provide for augmentation of the lifting coefficients of the wing during landing or take-off modes, the various devices are subject to the drawbacks in that they are configured so as not to fully utilize the high lift characteristics of which such flap structures are deemed to be capable and thereby fail to adequately realize their full efficacies.

SUMMARY OF THE INVENTION

The present invention is accordingly directed to the provision of a high lift augmenting device in order to attain maximum degrees of efficiency and an improved lift coefficient in imparting a lifting action to an aircraft wing during landing and take-off sequences of operation. The high lift device consists of a trailing edge flap which is articulated to a main airfoil of the aircraft wing structure, and whereby the upper surface of the flap is configured such that the curvature of upper surface thereof is not confined to the forward or leading end flap section where the latter is articulated to the trailing end portion of the main airfoil, but in which the upper surface curvature is permitted to be distributed along the entire length of the flap chord. In essence, this flap surface configuration will reduce the magnitude of any retarding pressure gradient experienced by and acting on the surface of the flap and allows the boundary layer to remain thin and attached over greater length to the surface of the flap; thereby improving lift characteristics of the flap.

The foregoing advantage in function is attained in that the upper surface of the trailing edge flap is imparted a chordwise measured curvature which causes a surface portion to protrude from the high speed airfoil surface configuration during flight configurations when the flap is stowed in the airfoil, such as for instance, during normal high speed cruise, so as to in effect impart an out-of-contour or "bump-like" surface shape to the flap during the stowed condition thereof in the airfoil.

The flap lifting efficiency is basically considered to be a measure as to the extent of how much lift increment is attained by the aircraft wing in comparison with a flap in pure potential flow (no boundary layer or viscous effects). With the curvature of the upper surface of the trailing edge flap being uniquely contoured in the manner contemplated by the present invention so as to produce a continuous curvilinear surface along the chord length of the flap, and relative to the upper surface of the main airfoil, the flap being deployed into the operatively deflected condition, the flap is designed to provide for higher lift efficiencies in comparison with presently conventional flap surface shapes. The foregoing advantages in attaining higher lift coefficients are obtained for simple hinged flap structures, single-slotted flap and multiple-slotted flap arrangements, as well as for flaps of double-hinged design configurations; in effect, flaps having mutually-hinged dual forward and rear flap portions.

Accordingly, it is a primary object of the present invention to provide a high lift device in the form of a flap which is articulated to the main airfoil of an aircraft wing which will improve the lifting characteristics and efficiencies of the airfoil.

Another more specific object of the present invention is to provide an aircraft wing constituted of a high lift main airfoil and of a high lift augmenting device such as a trailing edge flap which is articulated to the airfoil, wherein the upper surface of the flap, as measured along the chord length thereof, is configured in an out-of-contour configuration to produce a somewhat raised protruding shape during stowage of the flap in the airfoil during normal aircraft cruise conditions, so that the flap in the deflected deployed condition thereof constitutes an essentially continuous aerodynamic curvature in conjunction with the upper surface of the airfoil to thereby increase the lifting efficiency and efficacy of the aircraft wing structure during specific intervals in the operation of the aircraft.

Still another object of the present invention is to provide a method of utilizing the herein described out-of-contour trailing edge flap which is articulated to the main airfoil of an aircraft wing so as to enhance the high lift coefficients and efficiencies thereof during aircraft landing and take-off modes.

BRIEF DESCRIPTION OF THE DRAWINGS

Reference may now be had to the following detailed description of exemplary embodiments of the high lift device pursuant to the invention, preferably consisting of but not being limited to a trailing end flap for the main airfoil of an aircraft wing, taken in conjunction with the accompanying drawings; in which.

DETAILED DESCRIPTION OF PREFERRED EMBODIMENTS

Figures 1, 2, 3A:
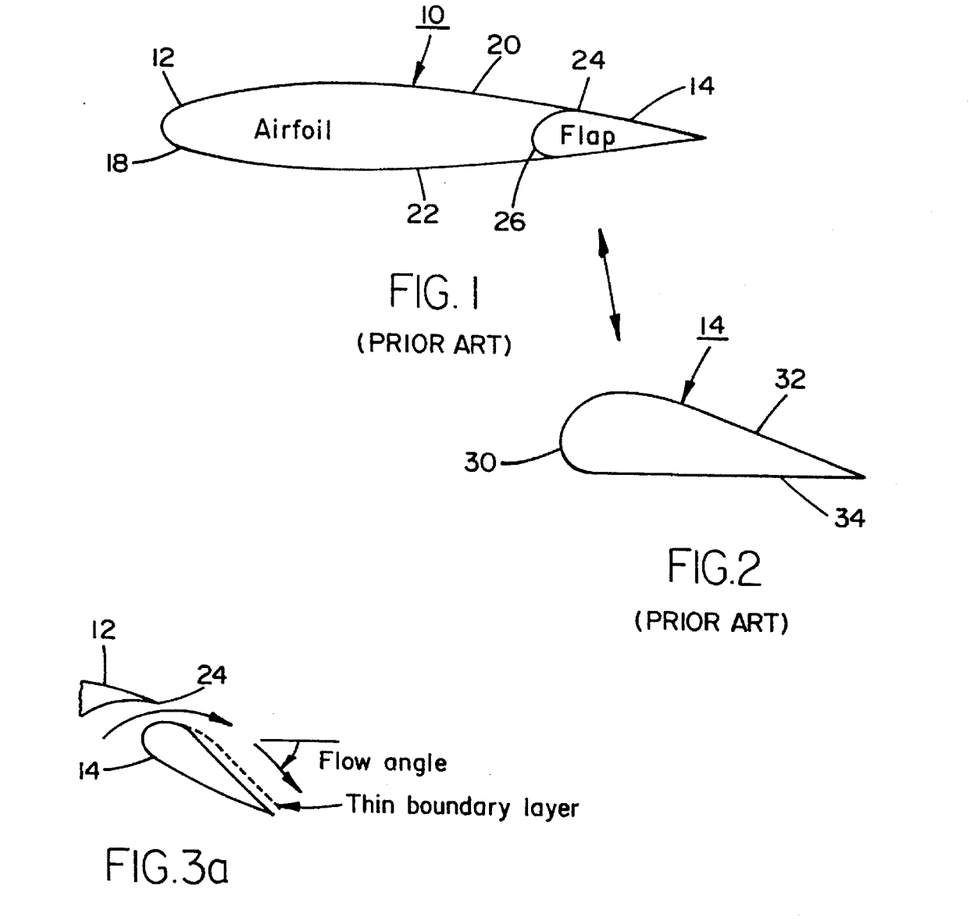
FIG. 1 illustrates a sectional view taken along the axis of the chord of the wing of an aircraft comprising a main airfoil and trailing edge flap assembly, the trailing edge flap being shown in its stowed position for cruise configuration.
FIG. 2 illustrates a view similar to FIG. 1 showing the contour of a trailing edge flap in accordance with the state-of-the-art.
FIG. 3a illustrates the trailing edge flap of FIG. 2 in a slotted configuration diagrammatically showing the boundary layer caused by the airflow.

Referring now in detail to the drawings and specifically to FIGS. 1 and 2, there is illustrated generally diagrammatically, cross-sectional representations taken along the chord axis of a conventional aircraft wing 10 comprising a main airfoil 12 having a trailing edge flap 14 articulated thereto; for example, by means of tracks and/or hinges so as to facilitate translational as well as rotational pivoting movement relative to the airfoil. The flap 14 is shown in the stowed position in the airfoil 12, which it assumes during normal cruise configuration for the aircraft, and is adapted to be deployed by being deflected or tilted downwardly into a high lift augmenting orientation during take-off and landing of the aircraft.

The main airfoil 12 of the aircraft wing 10 includes a rounded leading edge 18, an upper aerodynamically configured surface 20 and a lower aerodynamically configured surface 22, with a trailing end 24 preferably having a recess or cove 26 formed therein to enable stowing the trailing edge flap 14, as is well known in the high speed aircraft wing technology.

Pursuant to the current state of the art, the trailing edge flap 14, which is articulated to the main airfoil 12 through a suitable, actuating linkage mechanism (not shown) so as to be pivotable about a hinging axis relative thereto, has a sharply curved forward or leading end 30 adapted to be received within the cove 26 of the main airfoil 12, and upper and lower aerodynamic surfaces 32, 34 which form a rearward or trailing end extension for the main airfoil and which are primarily flat in shape. Alternatively, the upper aerodynamic surface 32 of the trailing edge flap may be somewhat curvilinear in shape so as to form a continuation of the upper aerodynamic surface 20 of the main airfoil 12 when the flap 14 is in the stowed condition shown in FIG. 1. However, essentially all of the trailing edge flap upper surface curvature is normally concentrated in the first or forward 30–40% of the flap chord length.

Figure 3B:
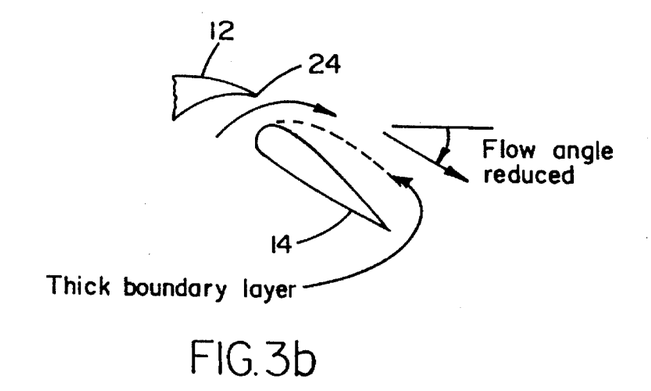
FIG. 3b illustrates a view similar to FIG. 3a showing a further stage in the formation of the boundary layer.
Figure 4A:
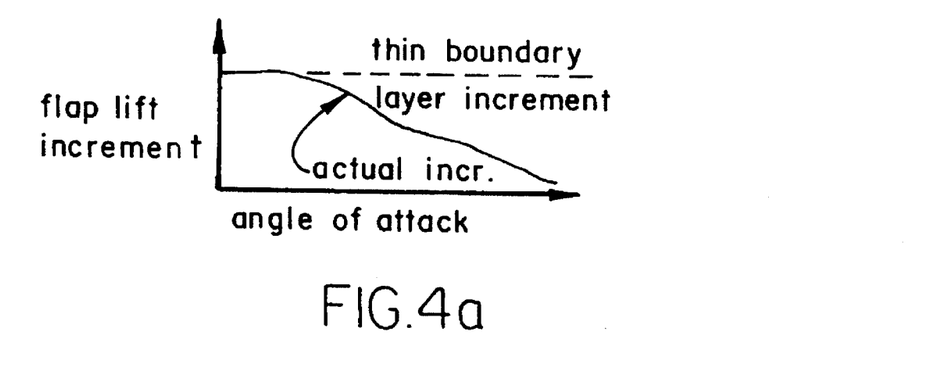
FIG. 4a illustrates graphical representation of flap lift increment plotted against the angle of attack for the flap.
Figure 4B:
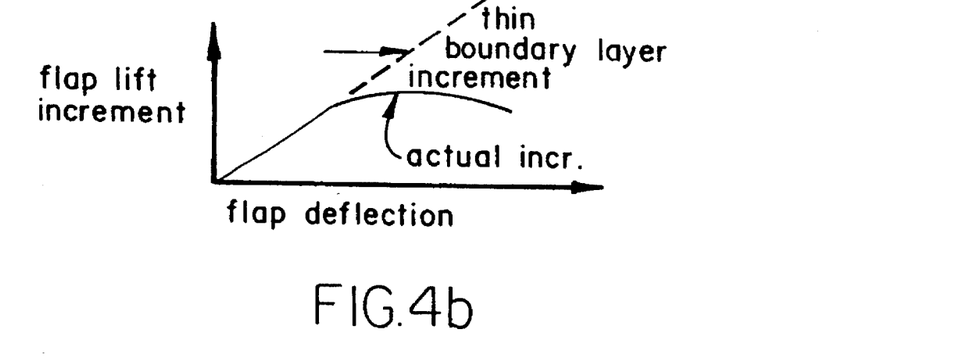
FIG. 4b illustrates a graphical representation of flap lift increment plotted against flap deflection.
Figures 7, 8, 9:
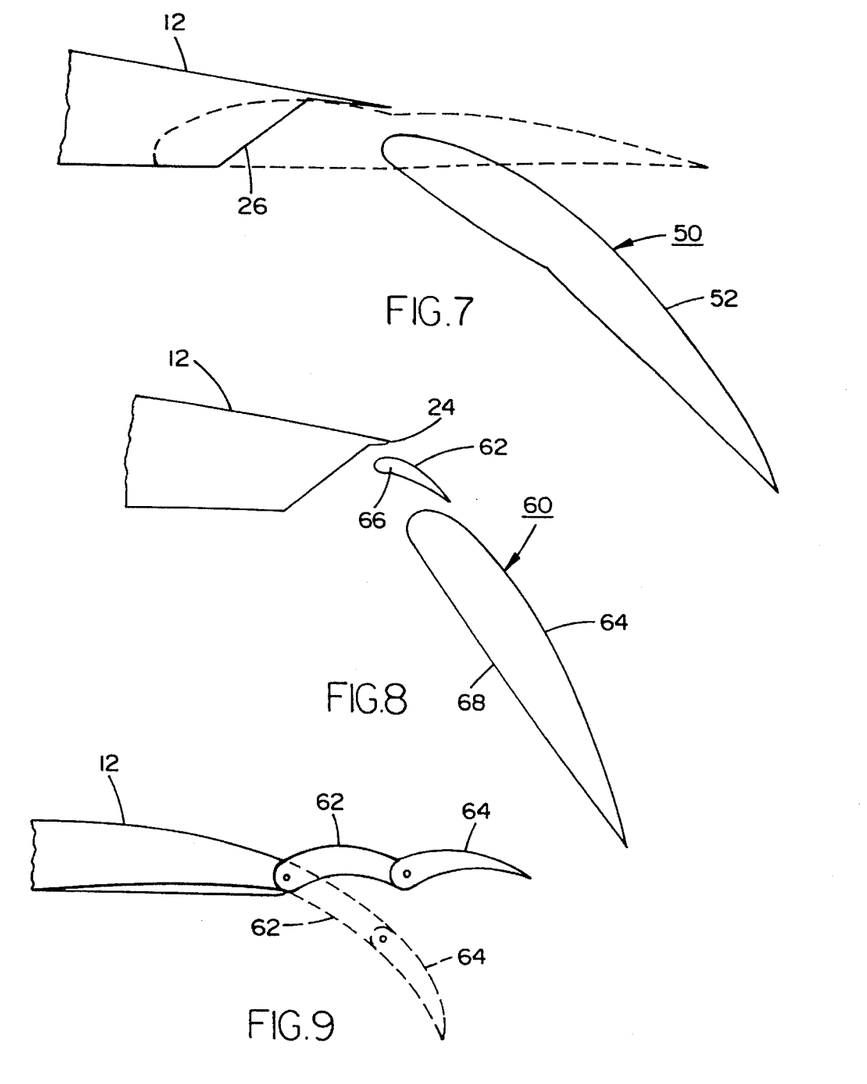
FIG. 7 illustrates a view similar to FIG. of a single-slotted configuration of the trailing edge flap, shown in both the stowed and deployed positions thereof.
FIG. 8 illustrates a view similar to FIG. 7 showing a double-slotted trailing edge flap configuration in its deployed position.
FIG. 9 illustrates a diagrammatic view similar to FIG. 8, showing the trailing edge flap construction consisting of a pair of successive flaps each having an out-of-contour flap surface configuration in the stowed condition and which are hinged to the main airfoil.

For a single-slotted assembly of the main airfoil and trailing edge flap, for example, as is diagrammatically represented in FIG. 7 of the drawings, in the deployed or downwardly deflected high lift position of the trailing edge flap 14 shown in FIGS. 1 and 2, referring to FIGS. 3a and 3b, there is created an opening at the trailing edge of the airfoil 12 so as to produce a slot between the cove 26 formed therein and the leading end 30 or extensively curved front portion of the trailing edge flap 14, which enables a stream of air to be accelerated therethrough and to flow over the upper aerodynamic surface 32 of the trailing edge flap 14. At that location, this flow of air mixes with and energizes air blowing over the surface of the main airfoil 12. The slot generates a high velocity airflow which must still follow the contour of the upper surface 32 of the flap 14. However, the high degree of curvature which is present at the leading end 30 of the trailing edge flap 14 produces a pressure gradient over the upper surface 32 of the flap 14 which retards the airflow, thereby causing an existing boundary layer which is normally desired to be thin as is shown in FIG. 3a, to thicken or even to separate from the surface, as indicated in FIG. 3b. A thicker boundary layer, as mentioned hereinbefore, reduces the amount of turning or curvilinear flow of the airflow and consequently evidences itself through a significant decrease in the added lift on the wing 10 normally resulting from the trailing edge flap 14 in its deployed condition. The foregoing reduction in the lift is experienced as a decrease in the additional lift due to the flap 14 as the angle of attack of the latter is increased (for a constant flap deflection), as represented in FIG. 4a of the drawings, or as a "roll-off" in the trailing edge flap lift increment at an increasing flap deflection (constant angle of attack) as represented in FIG. 4b of the drawings. The foregoing resultingly reduces the efficiency of the lifting action of the flap 14 and the effectiveness of the high lift desired during the deployment thereof, such as during landing or take-off of the aircraft.

Figure 5:
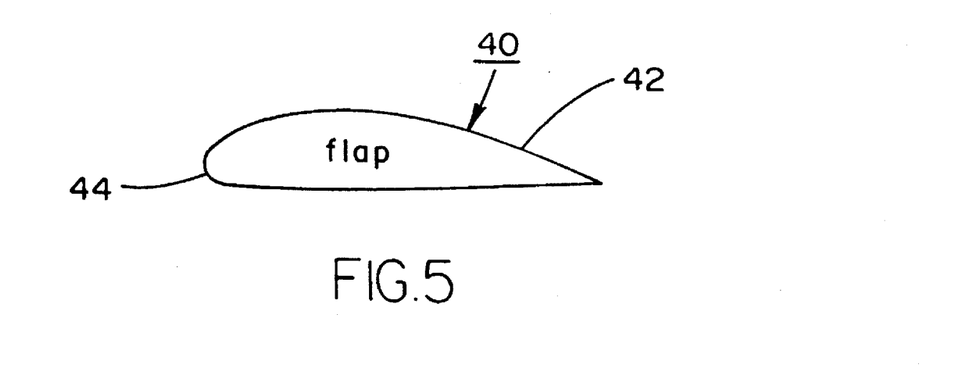
FIG. 5 illustrates a sectional view taken along the chord length of a trailing edge flap with an out-of-contour upper surface shape pursuant to the present invention.

In order to improve upon the coefficient of lift or essentially the efficiency of the lifting action of the trailing edge flap 14 as utilized in conjunction with the main airfoil 12 of an aircraft wing 10, pursuant to the invention as diagrammatically shown in FIG. 5 of the drawings, the trailing edge flap 40 illustrated therein has an upper aerodynamic surface 42 possessing a curvature which is distributed along substantially the entire length of the chord of the flap, rather than the curvature being confined to the forward portion of the flap as is the instance in the flap surface 32 of flap 14 shown in FIG. 2 of the drawings. The novel surface curvature distribution along the entire chordwise length of the trailing edge flap 40 reduces the magnitude of the retarding pressure gradient which is encountered due to the airflow passing through the slot between the trailing end of the airfoil 12 and the flap 40, and as a result permits the boundary layer to remain thin and attached longer to the flap surface. The resulting curvilinear configuration of the upper surface 42 of the trailing edge flap 40 during periods, when the flap is stowed in the main airfoil, in effect, the leading end portion 44 of the flap 40 is retracted into the cove 26 at the trailing edge 24 of the airfoil 12, evidences a somewhat raised or "bumplike" surface configuration, which may be generally referred to as an "out-of-contour" shape.

Different aspects of the inventive "out-of-contour" concept may be clearly ascertained from the airfoil and trailing edge flap assemblies, as illustrated in the various embodiments of FIGS. 6 through 9 of the drawings.

Figure 6:
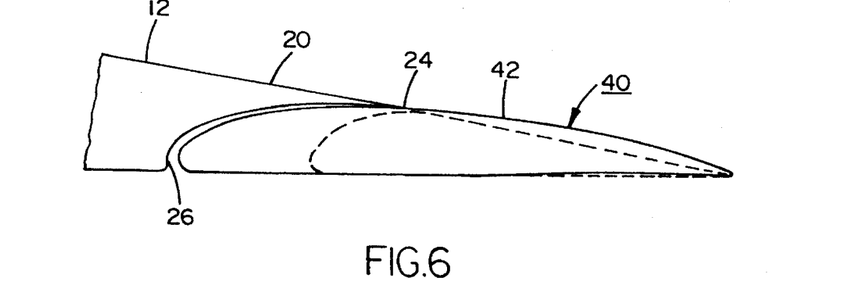
FIG. 6 illustrates a cross-sectional view taken along the chord axis of a portion of a wing airfoil showing the trailing edge flap in its stowed condition.

Thus, FIG. 6 illustrates, in a manner somewhat similar to the representation of FIG. 1, the fragmentary rear end portion of a main airfoil 12 and with the trailing edge flap 40 being that as represented in FIG. 5 hingedly articulated thereto. As may be clearly ascertained, the upper aerodynamically curvilinear surface 42 of the flap 40 forms a "bump-like" configuration or out-of-contour surface relative to the airfoil upper surface 20 when the flap 40 is stowed in the airfoil; i.e., retracted into the cove 26 of the latter.

FIG. 7 shows a single-slot configuration for the wing, and whereby a trailing edge flap 50 is shown in a deployed condition through solid lines, while the stowed condition thereof is represented by the dash lines. The flap 50 incorporates an articulating trailing edge portion 52 which deflects downwardly when the flap 50 is deployed, forming a smooth, continuous upper surface of higher deflection than the leading or front portion of the flap 50. The foregoing construction enables the boundary layer produced by the airflow to maintain its thin configuration and to adhere for a longer extent to the surface of the trailing edge flap 50 and thereby increase the lifting efficiency or high lift efficacy of the latter.

As illustrated in FIG. 8, there is provided a double-slotted trailing edge flap construction 60 with an out-of-contour upper surface 62, 64 for respectively each of the front and rear flap portions 66, 68 so as to provide a smoothly curvilinear aerodynamic surface arrangement in conjunction with the upper surface 20 of the main airfoil 12 when the flap construction is in the illustrated deployed condition.

FIG. 9 shows a double-hinged simple flap construction whereby, in the stowed condition thereof, the trailing edge flap portions 66, 68 will form two out-of-contour raised surfaces 62, 64, represented in FIG. 9 of the drawings in a somewhat exaggerated manner in order to emphasize this particular aspect. When deflected (as illustrated by the dashed lines in FIG. 9) into the deployed condition, the flap portions 66, 68 cause their upper surfaces 62, 64 to assume an essentially continuous aerodynamic curvature in conjunction with the upper surface 20 of the airfoil 12 to thereby increase the lifting efficiency and efficacy of the aircraft wing structure during specific intervals in the operation of the aircraft.

Figure 10:
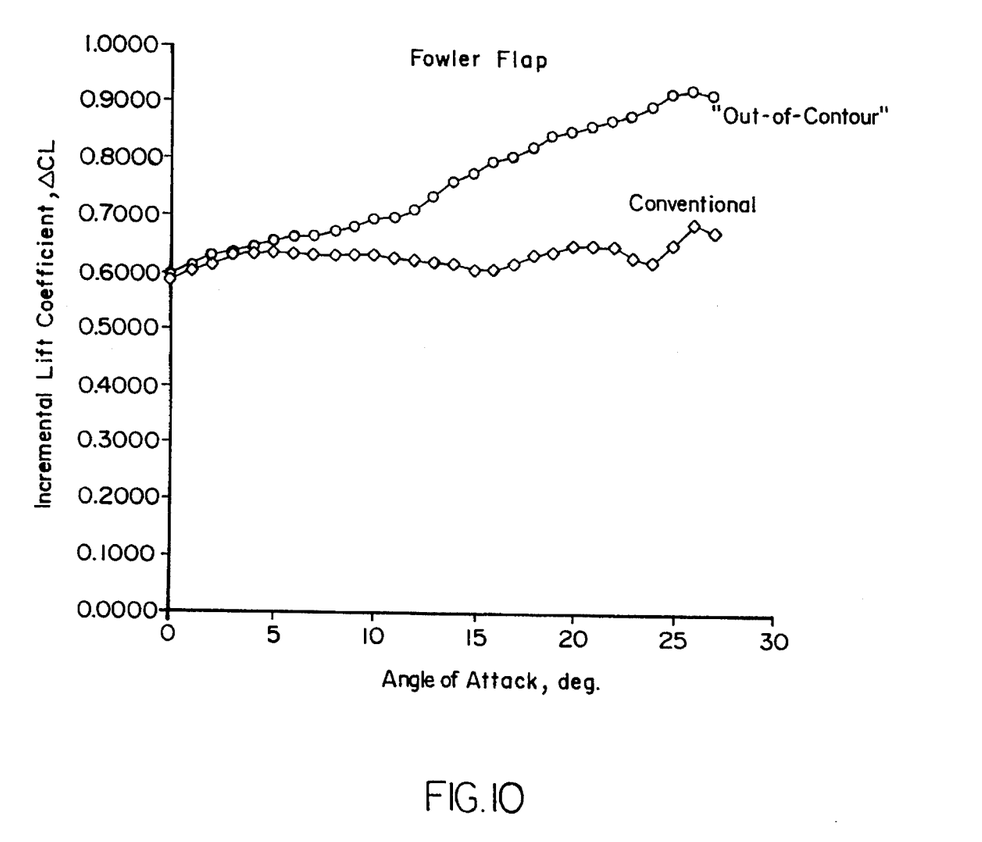
FIG. 10 illustrates a graphical representation of incremental lift coefficient measured over angle of attack of the flaps with slats extended for a Fowler flap possessing a conventional upper flap surface in comparison with a flap having an out-of-contour surface pursuant to the invention.

The flap lifting efficiency is a measure as to the amount of lift increment which is obtained in comparison with a flap in a pure potential flow (no boundary layer or viscous effects). Referring specifically to FIG. 10, there is illustrated a graphical representation in the lift performances of flaps with slats extended for a Fowler flap employing a conventional trailing edge flap in comparison with an "out-of-contour" flap configured pursuant to the invention. As indicated in this drawing figure, there is evident a substantial increase in the incremental lift coefficient ACL when utilizing the inventive out-of-contour trailing edge flap in comparison with a conventional trailing edge flap having flat converging upper and lower aerodynamic surfaces, measured over a range of angles of attack.

Figure 11:
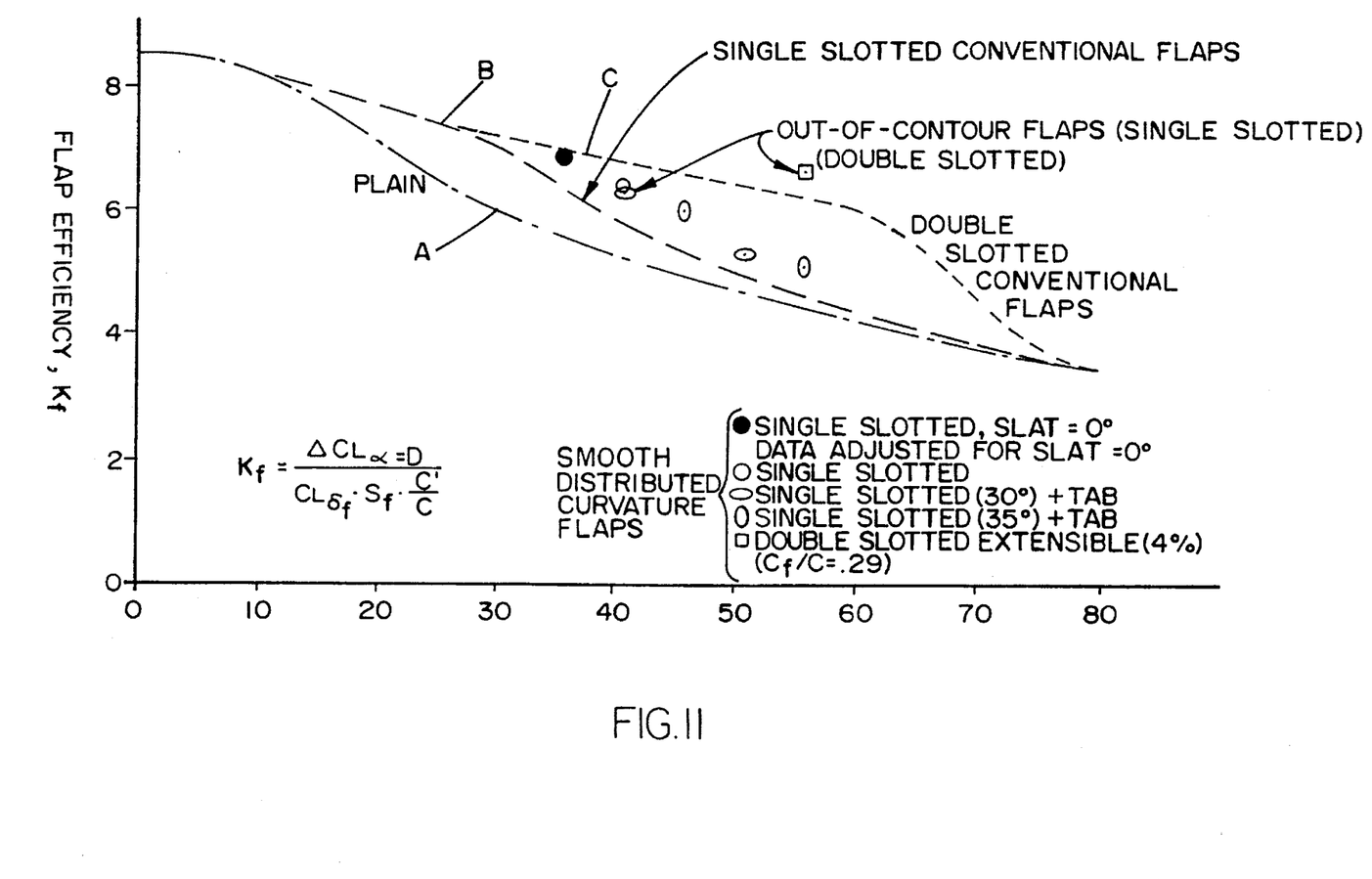
FIG. 11 illustrates a graphical representation of flap efficiency plotted relative to flap deflection about a hinge line articulated to an airfoil for various types of trailing edge flaps.

Moreover, as illustrated in FIG. 11 of the drawings, there is also shown a comparison between various flap efficiencies for different types of flaps. For a plain or essentially conventional trailing edge flap hinged to the main wing, the curve A shows the drop-off in efficiency relative to flap deflection; whereas a further curve B for a single-slotted conventional flap construction and curve C for a double-slotted conventional flap construction also show a similar drop-off in efficiency.

In comparison, the out-of-contour flap structure pursuant to the invention, shown for both single-slotted and double-slotted structures, clearly evidences an enhanced flap efficiency in comparison with the conventional trailing edge flaps. In all instances, irrespective as to whether single-slotted or double-slotted flaps, the inventive out-of-contour trailing edge flaps shown in the embodiments of FIGS. 5 through 9 have shown themselves to exhibit higher degrees of efficiency in contrast with those of the conventional trailing edge flaps currently employed in this technology.

Figure 12:
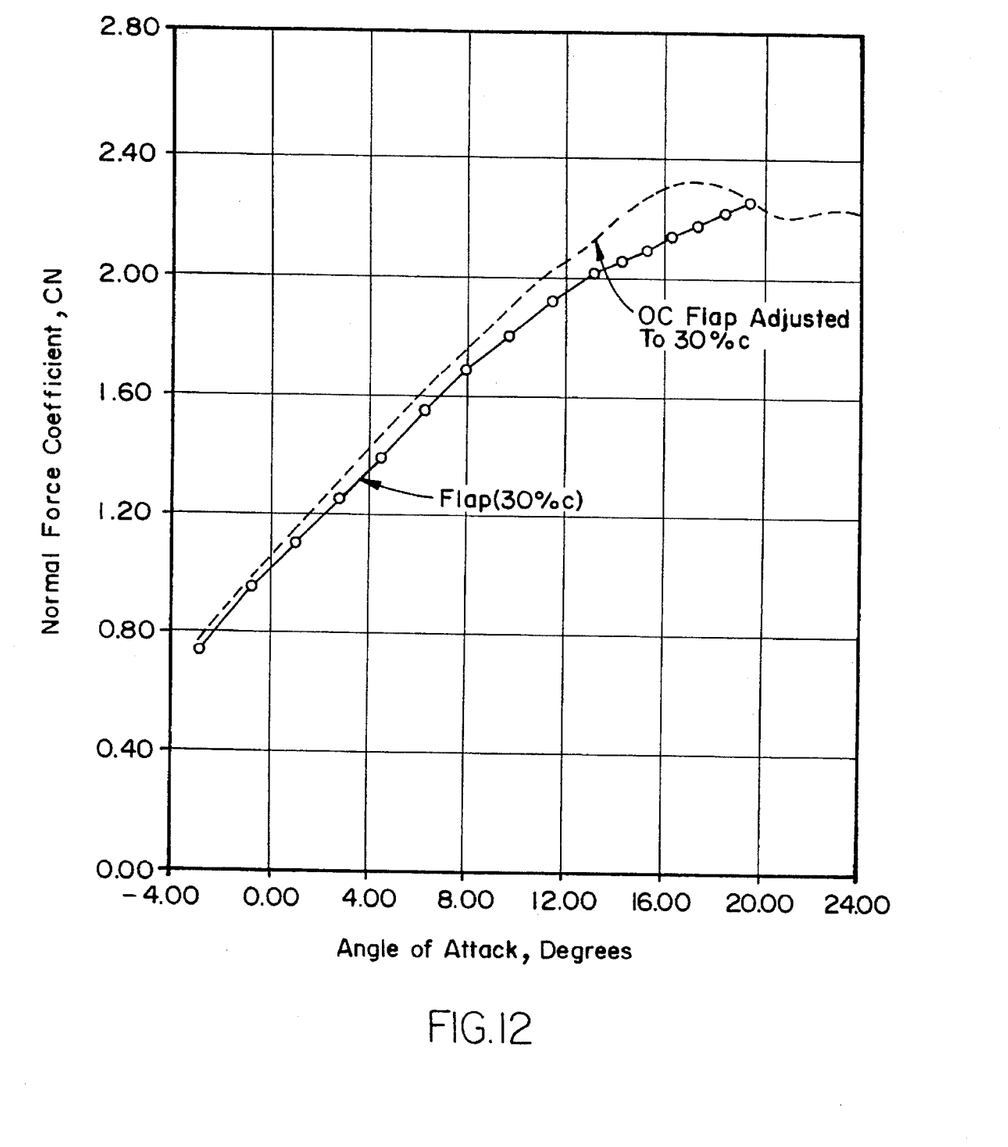
FIG. 12 illustrates a graphical representation of nominal force coefficient plotted relative to angle of attack and degrees for an out-of-contour trailing edge flap in comparison with a conventional trailing edge flap contour.

As illustrated in FIG. 12 of the drawings, there is graphically represented an "out-of-contour" trailing edge flap lift increment obtained at higher angles of attack, in which the solid-line curve represents a basic or conventional trailing edge flap pursuant to FIG. 2; whereas the dash-line curve represents flaps with the out-of-contour curvature pursuant to the present invention. This clearly is evidentiary of the aspect of the improved efficiencies obtained by the invention.

Figure 13:
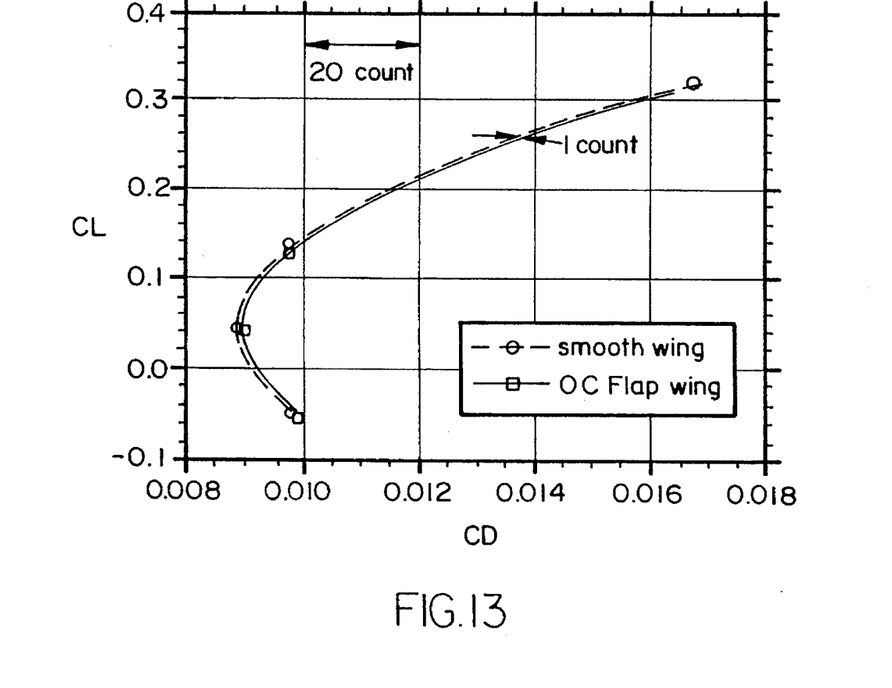
FIG. 13 illustrates a graphical representation of drag polars at cruise Mach number against lift coefficient of a flap pursuant to the present invention in comparison with a conventional flap.
Figure 14:
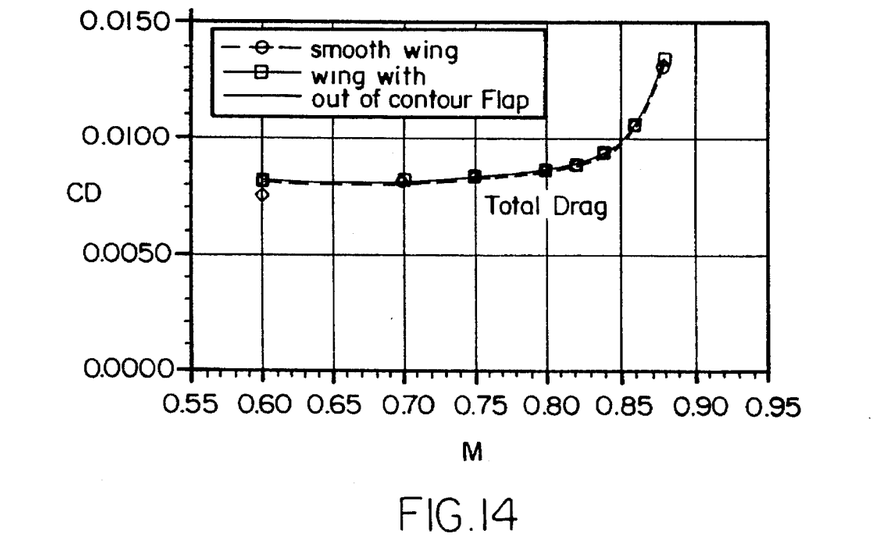
FIG. 14 illustrates a graphical representation similar to FIG. 13 of drag versus Mach number at a constant angle of attack for various types of trailing edge flap configurations.

Referring to FIG. 13 of the drawings, in the high speed cruise configuration of the wing 10, the out-of-contour trailing edge flap pursuant to the present invention; in essence, the so-called raised surface or "bump" in the upper aerodynamic surface when the flap is stowed, will at cruise Mach numbers for the aircraft produce only a negligible direct performance penalty, as shown by the plot of drag polars at aircraft cruise Mach number versus lift coefficient CL. This drag difference between an aircraft wing possessing a "smooth" or conventional airfoil and trailing edge flap assembly and one with the "out-of-contour" trailing edge flap is insensitive to Mach numbers, as can also be ascertained from FIG. 14 of the drawings illustrating the impact of the "bump" or out-of-contour (OC) curvature in the upper surface of the trailing edge flap as being practically negligible at high aircraft speeds.

A trailing edge flap with a distributive surface curvature pursuant to the invention can be readily obtained by starting with an airfoil of known desirable characteristics which is adapted to fit into the available cavity for the trailing edge flap or the cove 26 formed in the main airfoil 12. In particular, the selected airfoil 12 should produce a high lift as an unaugmented airfoil and may have to be modified to conform to the basic aircraft wing.

Figure 15:
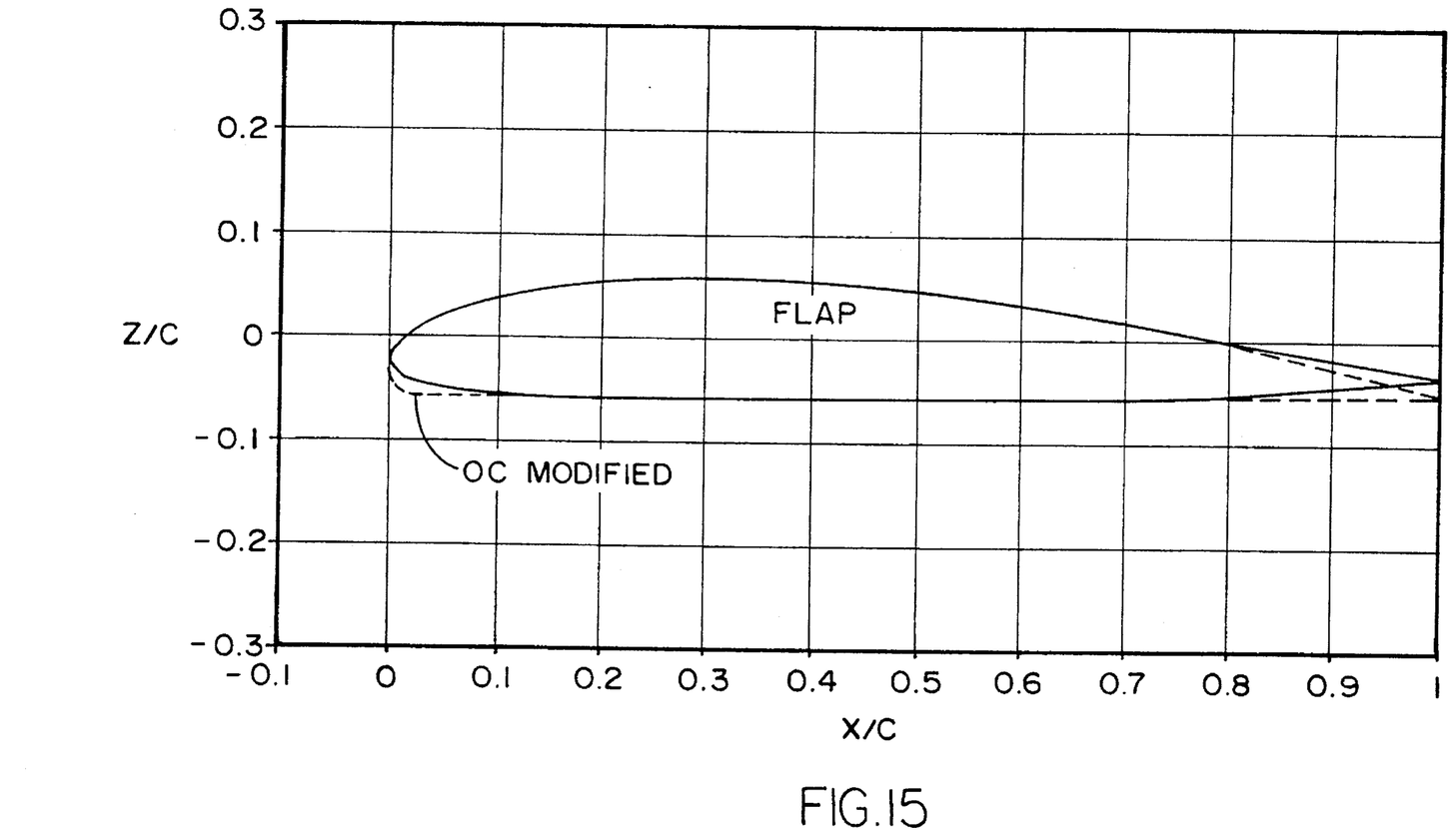
FIG. 15 illustrates a modification to a flap to form an out-of-contour trailing edge flap pursuant to the invention.

The drawing shown in FIG. 15 illustrates the modifications to improve the contour of the trailing edge flap when stowed in the main airfoil by simply flattening the lower surface of the trailing edge flap at the leading end thereof, as represented by the dash lines, and at the trailing edge as also shown by the dash lines, and with the contouring forward upper surface curvature being extended to meet the new lower flap surface with a leading edge possessing a small radius.

For an unslotted, or in effect a simple hinged trailing edge flap, the distributed curvature can be utilized to create a smooth contour when the trailing edge flap is deflected or deployed downwardly, having reference; for example, to the embodiment as shown in and described with reference to FIG. 9 of the drawings, thereby avoiding the presence of high degrees of curvature at the hinge line at which the flap is articulated to the main airfoil, and being able to thereby achieve a high degree of flap lifting efficiency at the specific design point (either at high speed or low speed, as desired).

In essence, as is clearly ascertainable from the foregoing description, the inventive trailing edge flap construction utilizing the upper surface "out-of-contour" configuration imparts a higher degree of efficiency and lifting coefficient in comparison with currently conventional flap constructions as employed in the technology. Specific applications of the invention due to the higher efficiencies obtained in the lift increments through the inventive trailing edge flap (with less lift roll-off) will enable new aircraft designs to employ smaller wings and a better air frame/engine match at high speed aircraft cruise. Existing aircrafts which have been subjected to an increase in weight (due to the installation of improved or auxiliary systems) can reduce take-off and landing speeds in view of the higher lift which is achievable through the inventive high lift augmenting device within the same flap space. The foregoing is of considerable significance with regard to existing aircraft approach and landing constraints, which are generally imposed on aircraft wing size, for instance, such as an carrier-based Navy aircraft. The invention is also advantageous irrespective as to whether employed on tactical military aircraft or on high-performance commercial aircraft of various types. Moreover, the inventive out-of-contour trailing edge flap can be readily retrofitted on existing aircraft wing structures without necessitating any extensive modifications.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A wing assembly for an aircraft, comprising:
   a) main airfoil having a leading edge, a trailing edge, and upper and lower surfaces extending between said leading and trailing edges;
   b) lift augmenting means for said wing assembly, said lift augmenting means comprising a trailing edge flap articulate to the trailing edge of said main airfoil, said flap having a leading edge, a trailing edge, and upper and lower surfaces extending between said leading and trailing edges, said flap upper surface having a smooth continuous curvature forming a distributed camber extending from the flap leading edge to the flap trailing edge thereby forming a raised out-of-contour shape relative to the upper airfoil surface upon said flap being stowed in said main airfoil and forming a continuous aerodynamic surface in deployed positions of said flap so as to enhance the lifting efficacy of said flap.

2. A wing assembly as claimed in claim 1, wherein said raised out-of-contour upper surface of said flap is imparted an aerodynamic curvature in conformance with the curvature of the upper airfoil surface in the deployed pivotably displaced positions of said flap.

3. A wing assembly as claimed in claim 1, wherein said raised out-of-contour upper surface of said flap forms a bump-like protuberance relative to the upper airfoil surface in the towed position of said flap in said main airfoil.

4. A wing assembly as claimed in claim 1, wherein said flap is pivoted downwardly relative to said main airfoil for deployment into a high lift augmenting orientation.

5. A wing assembly as claimed in claim 1, wherein said main airfoil includes a cove formed at the trailing edge thereof, said trailing edge flap having the leading edge of said flap articulated within said cove.

6. A wing assembly as claimed in claim 1, wherein said main airfoil and said trailing edge flap comprise a single-slotted airfoil and flap arrangement in the deployed high lift positions of said flap.

7. A wing assembly as claimed in claim 1, wherein said main airfoil and said trailing edge flap comprise a double-slotted airfoil and flap arrangement in the deployed high lift positions of said flap.

8. A wing assembly as claimed in claims 7, wherein said trailing edge flap comprises a front flap portion and a rear flap portion, said front flap portion having a leading edge articulated to the trailing edge of said main airfoil and said rear flap portion having a leading edge articulated to a trailing edge of said front flap portion.

9. A wing assembly as claimed in claim 8, wherein each said front and rear flap portion includes an out-of-contour upper surface of a smooth continuous curvature forming a distributed camber extending from the flap leading edge to the flap trailing edge thereby forming a bump-like protuberance on respectively each said upper flap surface in the stowed position of said trailing edge flap in said main airfoil.

10. A wing assembly as claimed in claim 8, wherein said front and rear flap portions conjointly form a continuous aerodynamic high lift arrangement in the deployed positions of said flap portions relative to said main airfoil.

11. A wing assembly as claimed in claim 1, wherein said flap is deployed during the landing mode for said aircraft.

12. A wing assembly as claimed in claim 1, wherein said flap is deployed during the take-off mode for said aircraft.

13. A wing assembly as claimed in claim 1, wherein said flap is stowed in said main airfoil during normal cruise configurations for said aircraft.

14. A lift augmenting device for the wing assembly of an aircraft, said wing assembly including a main airfoil having a leading edge, a trailing edge, and upper and lower surfaces extending between said leading and trailing edges, said lift augmenting device comprising a trailing edge flap articulated to the trailing edge of said main airfoil, said flap having a leading edge, a trailing edge, and upper and lower surfaces extending between said leading and trailing edges, said flap upper surface having a smooth continuous curvature forming a distributed camber extending from the flap leading edge to the flap trailing edge thereby forming a raised out-of-contour shape relative to the upper airfoil surface upon said flap being stowed in said main airfoil and forming a continuous aerodynamic surface in deployed positions of said flap so as to enhance the lifting efficacy of said flap.

15. Lift augmenting device as claimed in claim 14, wherein said raised out-of-contour upper surface of said flap is imparted an aerodynamic curvature in conformance with the curvature of the upper airfoil surface in the deployed pivotably displaced positions of said flap.

16. Lift augmenting device as claimed in claim 14, wherein said raised out-of-contour upper surface of said flap forms a bump-like protuberance relative to the upper airfoil surface in the stowed position of said flap in said main airfoil.

17. Lift augmenting device as claimed in claim 14, wherein said flap is pivoted downwardly relative to said main airfoil for deployment into a high lift augmenting orientation.

18. Lift augmenting device as claimed in claim 14, wherein said main airfoil includes a cove formed at the trailing edge thereof, said trailing edge flap having the leading edge of said flap articulated within said cove.

19. Lift augmenting device as claimed in claim 14, wherein said main airfoil and said trailing edge flap comprise a single-slotted airfoil and flap arrangement in the deployed high lift positions of said flap.

20. Lift augmenting device as claimed in claim 14, wherein said main airfoil and said trailing edge flap comprise a double-slotted airfoil and flap arrangement in the deployed high lift positions of said flap.

21. Lift augmenting device as claimed in claim 20, wherein said trailing edge flap comprises a front flap portion and a rear flap portion, said front flap portion having a leading edge articulated to the trailing edge of said main airfoil and said rear flap portion having a leading edge articulated to a trailing edge of said front flap portion.

22. Lift augmenting device as claimed in claim 21, wherein each said front and rear flap portion includes an out-of-contour upper surface of a smooth continuous curvature forming a distributed camber extending from the flap leading edge to the flap trailing edge thereby forming a bump-like protuberance on respectively each said upper flap surface in the stowed position of said trailing edge flap in said main airfoil.

23. Lift augmenting device as claimed in claim 20, wherein said front and rear flap portions conjointly form a continuous aerodynamic high lift arrangement in the deployed positions of said flap portions relative to said main airfoil.

24. Lift augmenting device as claimed in claim 14, wherein said flap is deployed during the landing mode for said aircraft.

25. Lift augmenting device as claimed in claim 14, wherein said flap is deployed during the take-off mode for said aircraft.

26. Lift augmenting device as claimed in claim 14, wherein said flap is stowed in said main airfoil during normal cruise configurations for said aircraft.

27. A method of augmenting the lifting efficacy of a wing assembly, said assembly comprising a main airfoil having a leading edge, a trailing edge, and upper and lower surfaces extending between said leading and trailing edges, comprising deploying lift augmenting means for said wing assembly, said lift augmenting means including a trailing edge flap articulated to the trailing edge of said main airfoil, said flap having a leading edge, a trailing edge, and upper and lower surfaces extending between said leading and trailing edges, said flap upper surface having a smooth continuous curvature forming a distributed camber extending from the flap leading edge to the flap trailing edge thereby forming a raised out-of-contour shape relative to the upper airfoil surface upon said flap being stowed in said main airfoil and forming a continuous aerodynamic surface in deployed positions of said flap so as to enhance the lifting efficacy of said flap.

28. A method as claimed in claim 27, wherein said raised out-of-contour upper surface of said flap is imparted an aerodynamic curvature in conformance with the curvature of the upper airfoil surface in the deployed pivotably displaced positions of said flap.

29. A method as claimed in claim 27, wherein said raised out-of-contour upper surface of said flap forms a bump-like protuberance relative to the upper airfoil surface in the stowed position of said flap in said main airfoil.

30. A method as claimed in claim 27, wherein said flap is pivoted downwardly relative to said main airfoil for deployment into a high lift augmenting orientation.

31. A method as claimed in claim 27, wherein said main airfoil includes a cove formed at the trailing edge thereof, said trailing edge flap having the leading edge of said flap articulated within said cove.

32. A method as claimed in claim 27, wherein said main airfoil and said trailing edge flap comprise a single-slotted airfoil and flap arrangement in the deployed high lift positions of said flap.

33. A method as claimed in claim 27, wherein said main airfoil and said trailing edge flap comprise a double-slotted airfoil and flap arrangement in the deployed high lift positions of said flap.

34. A method as claimed in claim 33, wherein said trailing edge flap comprises a front flap portion and a rear flap portion, said front flap portion having a leading edge articulated to the trailing edge of said main airfoil and said rear flap portion having a leading edge articulated to a trailing edge of said front flap portion.

35. A method as claimed in claim 34, wherein each said front and rear flap includes an out-of-contour upper surface of a smooth continuous curvature forming a distributed camber extending from the flap leading edge to the flap trailing edge thereby forming a bump-like protuberance on respectively each said upper flap surface in the stowed position of said trailing edge flap in said main airfoil.

36. A method as claimed in claim 34, wherein said front and rear flap portions conjointly form a continuous aerodynamic high lift arrangement in the deployed positions of said flap portions relative to said main airfoil.

37. A method as claimed in claim 27, wherein said flap is deployed during the landing mode for said aircraft.

38. A method as claimed in claim 27, wherein said flap is deployed during the take-off mode for said aircraft.

39. A method as claimed in claim 27, wherein said flap is stowed in said main airfoil during normal cruise configurations for said aircraft.

* * * * *